US012573698B2

(12) United States Patent
Munjurulimana et al.

(10) Patent No.: US 12,573,698 B2
(45) Date of Patent: Mar. 10, 2026

(54) HYBRID ENERGY-ABSORPTION FOR VEHICLE BATTERY PACK FRAMES

(71) Applicant: SABIC GLOBAL TECHNOLOGIES B.V., Bergen op Zoom (NL)

(72) Inventors: Dinesh Munjurulimana, Wixom, MI (US); Dhanendra Kumar Nagwanshi, Wixom, MI (US); Curtis Collar, Pittsfield, MA (US); Anil Tiwari, Bangalore (IN); Carlos Pereira, Selkirk, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 522 days.

(21) Appl. No.: 17/608,812

(22) PCT Filed: Jul. 1, 2020

(86) PCT No.: PCT/US2020/040551
§ 371 (c)(1),
(2) Date: Nov. 4, 2021

(87) PCT Pub. No.: WO2021/003299
PCT Pub. Date: Jan. 7, 2021

(65) Prior Publication Data
US 2022/0320659 A1 Oct. 6, 2022

(30) Foreign Application Priority Data
Jul. 1, 2019 (EP) ..................................... 19183620

(51) Int. Cl.
*H01M 50/242* (2021.01)
*B60K 1/04* (2019.01)
(Continued)

(52) U.S. Cl.
CPC ............. *H01M 50/242* (2021.01); *B60K 1/04* (2013.01); *B62D 21/157* (2013.01);
(Continued)

(58) Field of Classification Search
CPC ............. H01M 50/242; H01M 50/249; H01M 50/227; H01M 50/204; H01M 50/271;
(Continued)

(56) References Cited

U.S. PATENT DOCUMENTS 8,057,630 B2 11/2011 Hermann et al.
8,864,216 B2 10/2014 Nagwanshi et al.
(Continued)

FOREIGN PATENT DOCUMENTS

CN 202500446 U 10/2012
CN 103079899 A 5/2013
(Continued)

OTHER PUBLICATIONS

European Search Report for European Application No. 19183620.4; Application Filing Date: Jul. 1, 2019; Date of Search: Jan. 16, 2020; 6 pages.
(Continued)

*Primary Examiner* — Nicole M. Buie-Hatcher
*Assistant Examiner* — Taylor Harrison Krone
(74) *Attorney, Agent, or Firm* — CANTOR COLBURN LLP

(57) ABSTRACT
A vehicle battery pack frame for a vehicle comprising: a base having a length and a width; side members on opposite sides of the base, extending along the length of the base, and attached to a periphery of the base; and crossbeams extending across the width of the base, between the side members; wherein each of the side members comprises a profiled body comprising a sidewall having a first surface facing the cross beams, and an opposite second surface; and a polymer
(Continued)

reinforcement attached to the profiled body and facing the second surface of the sidewall of the profiled body.

13 Claims, 12 Drawing Sheets

(51) Int. Cl.

| | |
|---|---|
| *B62D 21/15* | (2006.01) |
| *B62D 29/00* | (2006.01) |
| *H01M 50/204* | (2021.01) |
| *H01M 50/227* | (2021.01) |
| *H01M 50/249* | (2021.01) |
| *H01M 50/271* | (2021.01) |

(52) U.S. Cl.
CPC ........ *B62D 29/001* (2013.01); *H01M 50/204* (2021.01); *H01M 50/227* (2021.01); *H01M 50/249* (2021.01); *H01M 50/271* (2021.01); *B60K 2001/0438* (2013.01); *H01M 2220/20* (2013.01)

(58) Field of Classification Search
CPC ................. H01M 2220/20; B60K 1/04; B60K 2001/0438; B62D 21/157; B62D 29/001
See application file for complete search history.

(56) References Cited

U.S. PATENT DOCUMENTS 9,758,029 B2    9/2017  Hokazono et al.

| | | | |
|---|---|---|---|
| 2012/0161472 A1 | | 6/2012 | Rawlinson et al. |
| 2018/0050607 A1 | * | 2/2018 | Matecki ................. B60L 50/64 |
| 2018/0337377 A1 | | 11/2018 | Stephens et al. |
| 2019/0308669 A1 | * | 10/2019 | Aitharaju ............... B62D 25/20 |
| 2019/0326573 A1 | * | 10/2019 | Ozawa ................. B62D 21/157 |
| 2021/0210808 A1 | * | 7/2021 | Schmitz ............. H01M 10/613 |

FOREIGN PATENT DOCUMENTS

| | | | |
|---|---|---|---|
| CN | 203434212 U | | 2/2014 |
| CN | 206893657 U | | 1/2018 |
| DE | 102009053138 A1 | | 5/2011 |
| DE | 102010050826 A1 | | 5/2012 |
| DE | 102012001596 A1 | | 8/2013 |
| DE | 102013005571 A1 | | 10/2014 |
| DE | 102013008428 A1 | | 12/2014 |
| FR | 3063458 A1 | | 9/2018 |
| WO | 2015193795 A1 | | 12/2015 |
| WO | 2017207503 A1 | | 12/2017 |

OTHER PUBLICATIONS

International Search Report for International Application No. PCT/US2020/040551; Application Filing Date: Jul. 1, 2020; Date of Mailing: Oct. 13, 2020; 6 pages.
Written Opinion for International Application No. PCT/US2020/040551; Application Filing Date: Jul. 1, 2020; Date of Mailing: Oct. 13, 2020; 7 pages.

* cited by examiner

INTRUSION (mm)

FORCE (kN)

HYBRID ENERGY-ABSORPTION FOR VEHICLE BATTERY PACK FRAMES

CROSS REFERENCE TO RELATED APPLICATIONS

This application is a National Stage application of PCT/US2020/040551, filed Jul. 1, 2020, which claims the benefit of European Application No. EP19183620.4, filed Jul. 1, 2019, both of which are incorporated by reference in their entirety herein.

BACKGROUND

Due to stringent worldwide carbon dioxide emission regulations, there is a greater focus on developing and using electric vehicles such as all-electric vehicles ("EVs"), plug-in hybrid vehicles ("PHEVs"), and hybrid vehicles ("HEV"; i.e., vehicles utilizing multiple propulsion sources one of which is an electric drive system)). Weight reduction is key to the viability of electric vehicles, because reducing the weight of the electric vehicles can extend their range.

One area of focus for weight reduction is the vehicle battery pack assembly, e.g., including the battery modules and the vehicle battery pack frame. Currently most vehicle battery pack frames use aluminum or high strength steel designs. These designs provide structural integrity and protection during an impact, but they are heavy.

It would be desirable to provide a lightweight vehicle battery pack frame for battery modules that is capable of protecting the battery modules during a side impact collision.

SUMMARY

Provided herein is a vehicle battery pack frame for a vehicle, a vehicle battery pack assembly comprising the vehicle battery pack frame and battery modules, and an electric vehicle comprising the vehicle battery pack assembly.

In an embodiment, the vehicle battery pack frame can include a base having a length and a width; side members on opposite sides of the base, extending along the length of the base, and attached to a periphery of the base; crossbeams extending across the width of the base, between the side members; and a cover to enclose a plurality of battery modules in the vehicle battery pack frame. Each side member includes a frame having a flange extending from a first side and a channel on a second side, wherein the base extends between the side members and over the flange of each side member; and a polymer reinforcement located in the channel.

BRIEF DESCRIPTION OF THE DRAWINGS

The following figures are exemplary embodiments wherein the like elements are numbered alike.

DETAILED DESCRIPTION

Figure 1:
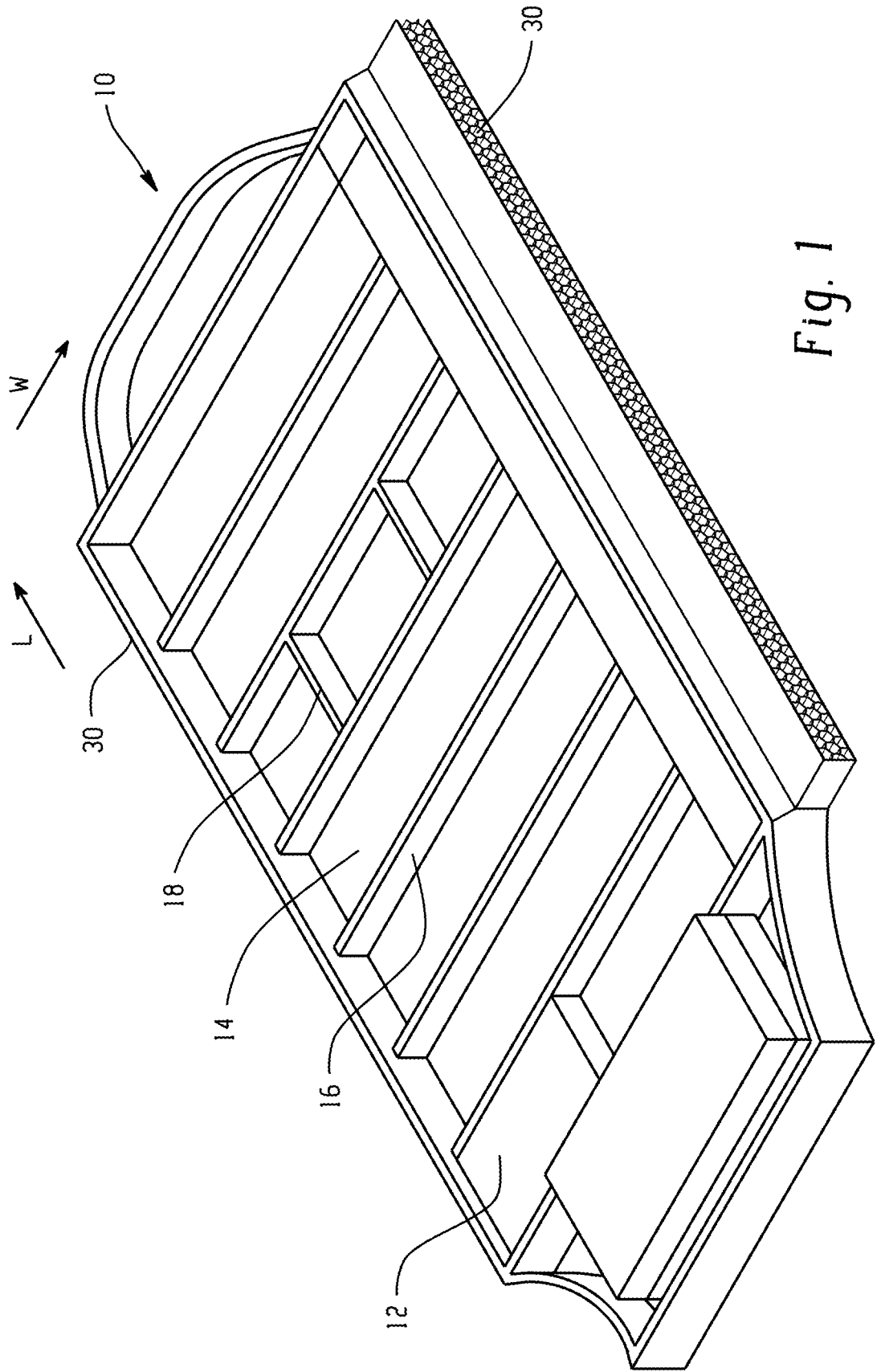
FIG. 1 is a perspective view of a representative battery pack for an electric vehicle comprising battery modules and a vehicle battery pack frame comprising the side members of FIG. 5.

Provided is an energy absorbing and distributing vehicle battery pack frame. The vehicle battery pack frame comprises side members, crossbeams, a base, optionally a cover, optionally partition(s), optionally a rear external support, and optionally a secondary battery support area. The side members include a profiled body to which the crossbeam(s) vehicle are attached. The side members extend in a direction parallel to a length direction ("L") of the vehicle (in the length direction), while the crossbeam(s) extend between the side members, across the width ("W") of the vehicle (in the width direction). For example, the crossbeams can extend in a direction between, and perpendicular to, the side members, and parallel to a width direction of the vehicle. The side members are configured such that during a rigid pole impact at 30 km/h the vehicle battery pack frame retains structural integrity according to Federal Motor Vehicle Safety Standard 214. Retention of structural integrity means that after impact, the rigid pole does not intrude into an inner space of the vehicle battery pack assembly and battery modules within the vehicle battery pack assembly are not compressed.

Side members in a vehicle battery pack assembly may perform multiple functions. The side members can contribute to structural integrity, for example, stiffness, of the vehicle battery pack assembly by providing structure to hold and support crossbeams of the vehicle battery pack assembly, which can include one or more battery modules. Desirably, the side members can be designed to also absorb and distribute energy in the event of a side impact and minimize or prevent intrusion into and impact to the battery modules. The present side members include a polymer reinforcement.

In the present design, a side impactor will first contact the polymer reinforcement prior to contacting the rear wall and optional box structure, and therefore, before contacting the crossbeams. Desirably, intrusion of the impactor sill be less than a depth ("D") of the polymer reinforcement. The side member (the polymer reinforcement, and the walls over and optional wall in front of the polymer reinforcement) can provide energy absorption before a side impactor contacts the surface of the w to which the crossbeam(s) are attached. The profiled body can constrain deformation of the polymer reinforcement, but may provide a minimal amount of axial stiffening. The side members can provide bending stiffness such that the vehicle battery pack assembly can be mounted to an electric vehicle. Due to the design, the side members provide part integration and weight savings compared to multi-piece metal members arranged to form a stiff, protective support.

When installed in a vehicle, the vehicle battery pack frame can be positioned between the front and rear vehicle suspension assemblies and mounted between, and mechanically coupled to, vehicle structural members (e.g., rocker panels) located on either side of the vehicle. The vehicle battery pack frame can be mounted below and attached to the vehicle floor panel.

The vehicle battery pack assembly transverses at least a portion of the width of the vehicle, i.e., from rocker panel to rocker panel, and also extends between the front suspension and the rear suspension. The size of the vehicle battery pack assembly is not particularly limited and is dependent upon the size of the vehicle and dependent on the desired battery capacity and the size of the battery modules. For example, the vehicle battery pack assembly can be up to 3 meters (m) long (e.g., approximately 2.7 m long) and up to 1.5 meters wide. Therefore, the side members can have a length of up to 3 m, for example, greater than 1 to 3 m, or, 1.5 m to 2.0 m. The thickness of the vehicle battery pack assembly can vary from 0.1 meters to 0.18 meters, the thicker dimension applicable to those portions of the vehicle battery pack assembly in which battery modules are positioned one on top of one another.

A more complete understanding of the vehicle battery pack assembly disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 is a representative image of a vehicle battery pack assembly 10 for an electric vehicle including battery modules 12 and a vehicle battery pack frame 11, comprising side members 30, partition members 18, and crossbeams 16. A single battery module 12 can be positioned within a section of the vehicle battery pack assembly 10 defined by the side members 30, the crossbeams 16, and a base 14. The side members 30 extend along the length L of the vehicle battery pack assembly 10. The crossbeams 16 extend between the side members, and have a height that can span from the base 14 to a cover 20 (see FIG. 3), thereby forming closed partitions. The partitions can be defined at least in part by the crossbeams 16, the partition members 18, and optionally the side members 30, in the vehicle battery pack assembly 10. Optionally, partition members 18 can extend between adjacent crossbeams 16, and between adjacent battery modules 12. The battery modules 12 can be disposed on the base 14 of the vehicle battery pack assembly 10. Each of the sections (between adjacent crossbeams 16) can house one or more battery modules 12, for example, a pair of battery modules 12. Optionally, back-up battery modules (also referred to as secondary battery modules) can be present.

Figures 2, 3, 4:
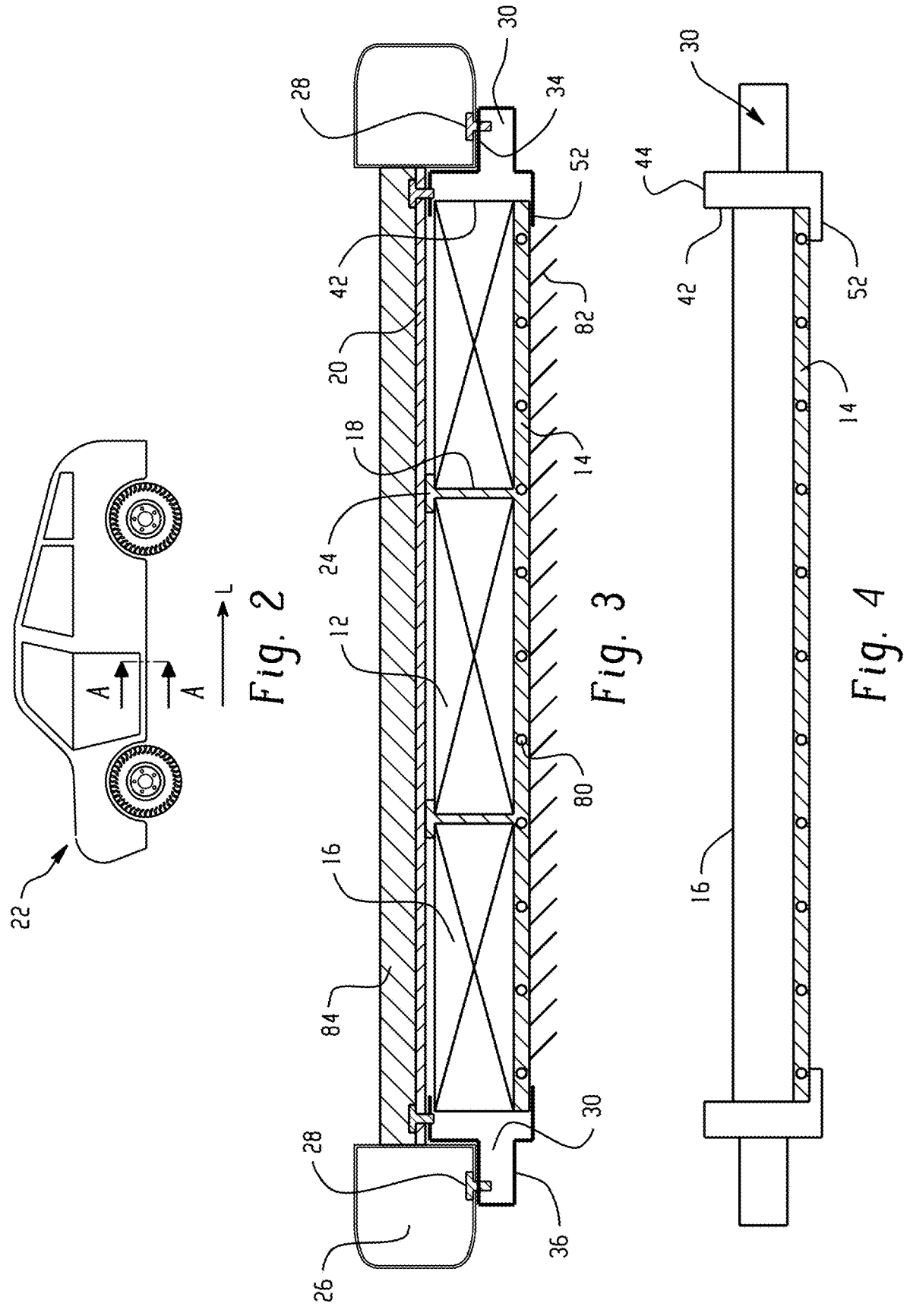
FIG. 2 is a representative side view of a vehicle comprising the vehicle battery pack assembly.
FIG. 3 is a partial cross-sectional side view taken along lines A-A of FIG. 2 illustrating the vehicle battery pack assembly attached to the vehicle floor rockers.
FIG. 4 is a side view illustrating a crossbeam attached to side members of a vehicle battery pack assembly.

FIG. 3 is a partial cross-sectional view taken along line A-A of FIG. 2, illustrating a vehicle battery pack assembly 10 in a vehicle 22. The vehicle battery pack assembly 10 comprises the side members 30 with a flanges 52 extending from one side member 30 toward the opposite side member 30. Disposed on and attached to the flanges 52 is the base 14. The base 14 can be disposed on the flanges 52 of the side members 30, and crossbeam 16 can be disposed on the base 14. The base 14 extends between the side members 30 and below the crossbeams 16. Front and rear ends of the vehicle battery pack assembly 10 can have additional crossbeams 16 to improve the structural integrity of the vehicle battery pack assembly 10. The base 14 can enable heat transfer, e.g., cooling, of the battery modules 12. For example, the base 14 can comprise conduits 80 for heat transfer fluid (e.g., a medium such as air or liquid (e.g., water or other heat transfer fluid) that does not enter an interior of the vehicle battery pack assembly 10) to remove heat from the battery modules. In addition or alternative to the conduits 80, the base can have heat transfer fins 82 to allow heat transfer to the surrounding environment. When the vehicle battery pack assembly 10 is attached to the vehicle 22, a side of the base 14 facing away from the battery modules 12 is exposed to the environment.

Desirably, a barrier between the battery modules 12 and the surrounding environment is formed. e.g., by the cover 20, side members 30, and the base 14. In other words, the base 14, side members 30 and the cover 20 form an enclosure for accommodating the battery modules 12. In addition, the front and rear sides of the vehicle battery pack assembly 10 can be formed with two additional crossbeams 16. The enclosure can be provided with one or more openings for airflow. The cover 20 can attach to the side members 30 with mechanical fasteners and/or chemical attachments. Examples of mechanical fasteners include snaps, hooks, screws, bolts (e.g., threaded bolt(s), rivets, welds, crimp(s) (e.g., a crimped metal wall). Chemical attachments can include bonding agents such as glues, adhesives, and so forth. Desirably, the cover 20 can be removably attached to the side members 30, for example, using a mechanical attachment that can be detached without damage to the side members 30. Removable attachment simplifies battery module 12 replacement as well as allowing battery module 12 interconnecting means, components of the vehicle battery pack assembly 10, cooling system components and other components of the vehicle battery pack assembly 10 to be repaired and/or replaced.

The vehicle battery pack assembly 10 may be configured as a substantially airtight enclosure, based upon sealing between the side members 30, the base 14, and the cover 20.

As is shown in FIG. 3, the vehicle battery pack assembly 10 is coupled to the vehicle 22. The vehicle battery pack assembly 10 can be attached to the vehicle 22 with various mechanical fastener(s) such as those noted above. Illustrated is the side members 30 attached to the floor rockers 26 of the vehicle 22 with mechanical fasteners 28. Therefore, the vehicle battery pack assembly 10 can be located under the vehicle 22, under the vehicle floor panel 84, and attached to and extend between the floor rockers 26.

The vehicle battery pack assembly 10 can include partition members 18 that extend in a direction parallel to the side members and that separate battery modules 12. Each of the partition members 18 can include a portion 24 opposite the base 14 that helps secure the battery modules 12 within the vehicle battery pack assembly 10 by overlapping with at least a portion of the battery modules 12.

FIG. 4 schematically shows how the side members 30 and crossbeams 16 can be attached. For example, the side members 30 can include a flange 52 and the crossbeams 16 can be attached to the flange 52, either adjacently, or via the base 14, or via another means. The base 14 may be supported on the flanges 52, for instance in between the flanges 52 and the crossbeams 16.

Figures 5, 6:
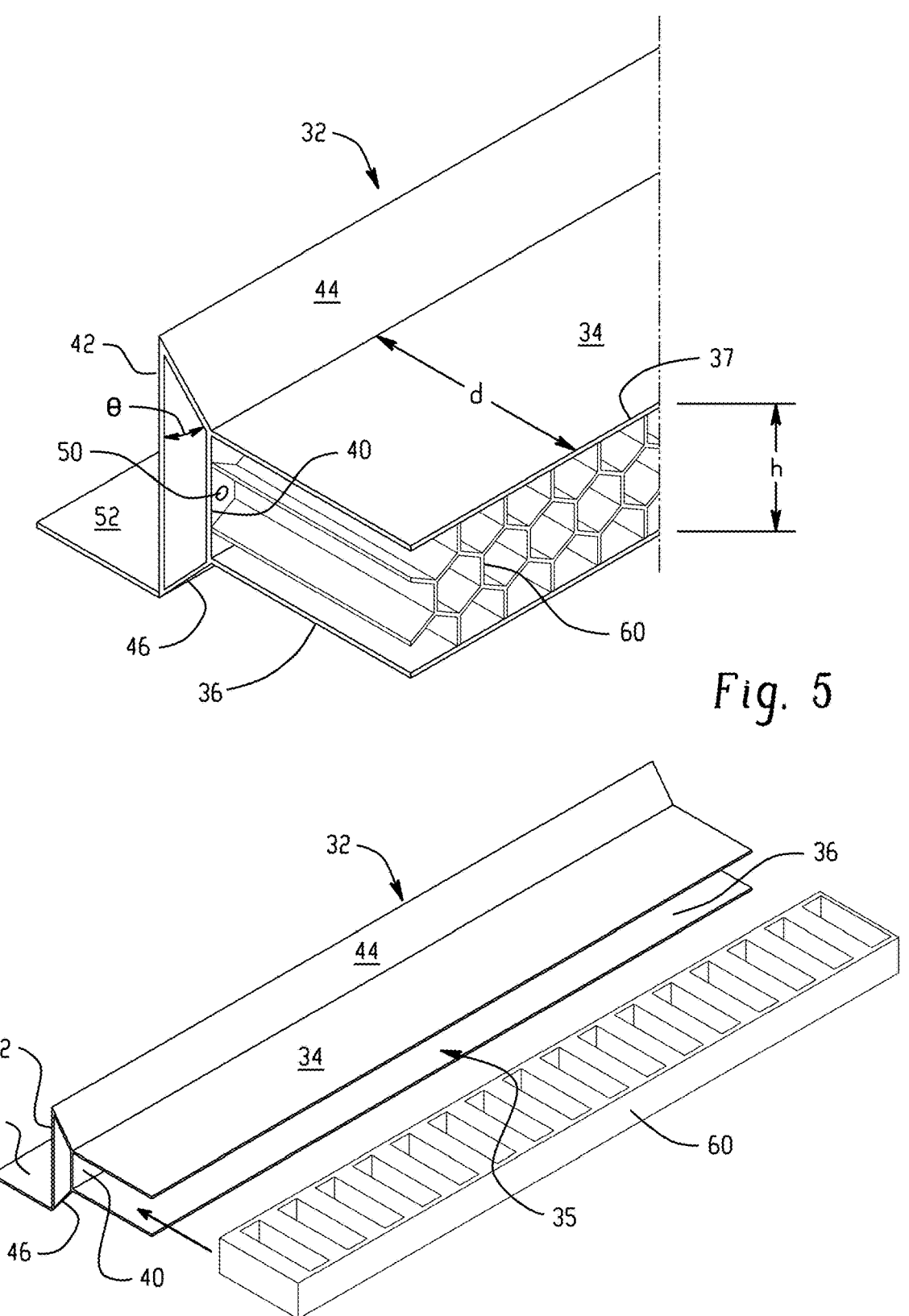
FIG. 5 is a partial perspective view of an embodiment of a side member comprising a hybrid structure.
FIG. 6 is a perspective expanded, front view of another embodiment of a side member including a frame and a polymer reinforcement.

FIG. 5 shows a hybrid side member 30, i.e., including a profiled body 32 and a polymer reinforcement 60 located therein. The polymer reinforcement 60 can optionally be mechanically or chemically attached to the profiled body 32. For example, the polymer reinforcement 60 can be overmolded on the profiled body 32. Alternatively or in addition, mechanical fasteners and/or chemical attachments can be employed such as those described above. A friction fit can also be used to maintain the polymer reinforcement 60 in the profiled body 32. As the polymer reinforcement 60 is opposite a surface of the profiled body 32 to which crossbeams 16 are attached, the polymer reinforcement 60 is not directly attached to the crossbeams 16.

The polymer reinforcement 60 can lock to the profiled body 32 to create a mechanical bond between the profiled body 32 and the polymer reinforcement 60 without the use of an adhesive. Optionally, a wall can include an opening 50 through the wall such that, when the polymer reinforcement 60 is formed, molten polymer can pass from within the cavity, through the opening, and solidify to further secure the polymer reinforcement 60 within the profiled body 32.

The hybrid side member allows to obtain complex geometries which otherwise could have been difficult to achieve using only metals or composites. The polymer reinforcement can comprise a rib structure. For examples, ribs can extend across a channel 35 between and defined by the top wall 34 and the bottom wall 36, and/or along the length of the channel 35 between and defined by the top wall 34 and the bottom wall 36 towards the sidewall 42 or rear wall 40. Various rib designs are possible, including triangular, rectangular, diagonal, crossed, and the like. The ribs can form an array of columns forming an alveolar structure (e.g., a honeycomb geometry), such as shapes having greater than or equal to 3 sides, such as triangular, pentagonal, hexagonal, heptagonal, and octagonal, and so forth, preferably having a hexagonal geometry. Other geometries, for instance a geometry including channels, are possible as well. The columns and/or channels of a geometry may have one or more open end.

Optionally, the polymer reinforcement, and hence the ribs of the polymer reinforcement, can extend from an end edge 37 of the top wall 34 to the rear wall 40, i.e., over a distance d defining the width of the top wall 34, or at least a portion of distance d, and if no rear wall 40 is present, to the sidewall 42, i.e., beyond the distance d or beyond the width of the top wall 34. The distance D is different from zero. The ribs can be extruded, separately formed and bonded together to form the desired structure, injection molded, or otherwise formed. Optionally, the polymer reinforcement can be formed by overmolding the plastic reinforcement into the profiled body 32 using an injection molding process (e.g., such as the designs of FIGS. 5, 8A, and 10. The polymer reinforcement 60 can be coextruded with a profiled body 32, resulting in a single-piece. Polymer reinforcement 60 can be coextruded with metal using a die, which can incorporate multiple materials. For example, the die may contain provisions to extrude metal on the periphery whereas inside plastic material is extruded at the same rate as that of the metal is extruded. Alternatively, the polymer reinforcement 60 can be formed and then inserted into the profiled body 32 (See FIGS. 5, 6, 7A, 9, and 10). Preforming the polymer reinforcement 60 allows the channels and/or columns 33 to be oriented in any desired direction, e.g., extending between the top wall 34 and the bottom wall 36 (See FIGS. 6, 7A), e.g., perpendicular to those walls. The channels and/or columns 33 of the structure can extend toward the sidewall 42 (see FIGS. 5, 8A, 9), e.g., perpendicular thereto and parallel to the top wall 34 and the bottom wall 36. The columns and/or channels 33 of the structure can extend along the length of the side member 30 (e.g., see FIG. 10), e.g., parallel to the sidewall 42. The orientation of the channels and/or columns 33 with respect to walls 34, 36, 42, can be chosen to attain desirable energy absorption characteristics. For example, the open ends may be directed to the top wall 34 and/or the bottom wall 36.

The polymer reinforcement 60 can be dimensioned to absorb energy during a side impact to the vehicle battery pack assembly. For example, a distance between non-adjacent ribs can vary from 20 mm to 40 mm and a rib thickness can vary from 1.5 mm to 5.0 mm.

The polymer reinforcement 60 may comprise at least one of an acrylonitrile-butadiene-styrene (ABS); polycarbonate; acrylic-styrene-acrylonitrile (ASA); phenylene ether; polyphenylene ether; polycarbonate (PC); polyamide; polyethylene terephthalate (PET); polybutylene terephthalate (PBT); polyamide; phenylene sulfide; polyvinyl chloride (PVC); (high impact) polystyrene; polyolefin (such as polypropylene (PP) (e.g., expanded polypropylene (EPP)) or polyethylene); polysiloxane; polyurethane; or thermoplastic olefin (TPO).

The polymer reinforcement 60 may comprise a filler, e.g., fibers. Possible fiber material may include at least one of glass, carbon, aramid, or plastic, preferably glass. The fiber length can be chopped, long, short, or continuous. Therefore, the polymer reinforcement 60 may comprise a fiber-filled thermoplastic material. For example, a fiber-filled polyolefin can be used. In particular, long glass fiber-filled polypropylene may be used. In the case of short glass fiber filled polymer, initial fiber length can vary from 1.5 to less than 3 mm, and after molding the fiber length can vary from 0.2 to 0.5 mm. Long fibers are defined as having an initial fiber length, before molding, of at least 3 mm to, for example, 10 mm to 15 mm, having a post-molding length that is longer than that of the short glass fibers defined above.

Optionally, an aesthetic cover can be present over the side members 30, and in particular the polymer reinforcement. The cover can inhibit debris from entering the polymer reinforcement.

As is shown in FIG. 6, the polymer reinforcement 60 can be disposed in a channel 35 formed by the profiled body 32. The channel 35 can be formed by the top wall 34, the bottom wall 36 and a rear wall 40 or a sidewall 42. Rear wall 40 can extend between the top wall 34 and the bottom wall 36 at one end of the top wall 34. On a side of the rear wall 40 opposite the channel 35 the profiled body can comprise a box structure 38 (e.g., a four sided box structure; see. e.g., FIG. 7C) formed by the rear wall 40, a first connector wall 44, a second connector wall 46, and a sidewall 42. The first connector wall 44 extends between the sidewall 42 to the top wall 34, e.g., at rear wall 40, while the second connector wall 46 extends between the sidewall 42 to the bottom wall 36. e.g., at rear wall 40. The sidewall 42 has a height that is greater than a height of the channel 35, and/or greater than the height of the rear wall 40, hence increasing the height of the channel 35 at the location of the box structure 38. Preferably, at least one longitudinal edge of the sidewall 42 extends beyond a longitudinal edge of the rear wall. More preferably, the longitudinal edges of the sidewall 42 extend beyond the longitudinal edges of the rear wall in a symmetric fashion, i.e. the lengths of the extensions are equally distributed. The first connector wall 44 and second connector wall 46 can extend at an angle $\ominus$ of 90 degrees from the sidewall 42 towards the channel 35. Alternatively, the first connector wall 44 and second connector wall 46 can extend at an angle $\ominus$ of less than 90 degrees from the sidewall 42, e.g., at an angle of 30 to 75 degrees, preferably 40 to 50 degrees, towards the channel 35. The box structure 38 may have a rectangular or trapezoid geometry. The connector walls 44, 46 may have other geometries as well, such as rounded or bent, or even stepped.

Extending from the sidewall 42, in a direction opposite the channel 35, can be a flange 52. The flange 52 can extend from an end of the sidewall 42, or from a location at a distance different from zero from the end of the sidewall. Preferably, the flange 52 extends from a lower half of the sidewall 42, the lower half being defined as the part of sidewall 42 that is nearer to the bottom wall 36 than to the upper wall 34 of the profiled body 32. The base 14 can be attached to the side member 30 via the flange 52 and/or the sidewall 42 and the crossbeam 16 can be mounted on top of the base 14 and the flange 52. The attachment can be with various mechanical fasteners and/or chemical attachments as described above.

The profiled body 32 can provide structural integrity to the vehicle battery pack assembly 10. Structural integrity of the vehicle battery pack assembly 10 may be based on the bending and torsional stiffness of the vehicle battery pack assembly 10 during transportation and use. The exact thickness is dependent upon the particular material for the walls and the desired structural integrity. For example, for a steel profiled body 32 the thicknesses of walls can be 0.5 mm to 2 mm, while for aluminum, the thicknesses of the walls can be 1.0 mm to 8.0 mm. As such, the thickness of each of the walls, the top wall 34, the bottom wall 36, the rear wall 40, the sidewall 42, the first connector wall 44, and second connector wall 46 can be chosen based upon a desired structural integrity. For example, as the polymer reinforcement 60 is intended to absorb side impact energy, the thickness of the top wall 34 and the bottom wall 36 can be less than the thickness of the rear wall 40, the sidewall 42, the first connector wall 44, and second connector wall 46. For example, the top wall 34 and the bottom wall 36 can have a thickness of 0.5 mm to 1.6 mm, specifically, 1.0 mm to 1.5 mm, and more specifically 1.3 mm to 1.4 mm. The rear wall 40 can have a thickness of 0.5 mm to 4.0 mm, preferably 1 mm to 1.5 mm. The sidewall 42 can have a thickness of 0.5 mm to 4.0 mm, preferably 1.00 mm to 1.5 mm. The first connector wall 44 and/or second connector wall 46 can have a thickness of 0.5 mm to 3.00 mm, preferably 1.0 mm to 1.5 mm.

The profiled body 32, base 14, cover 20, and crossbeams 16, can each, individually, be metal and/or a composite. The composite can include a polymer (such as fiber reinforced polymer (e.g., thermoplastic or thermoset) and the profiled body 32, base 14, cover 20, and crossbeams 16, can each, individually, include metal and a composite. For example, the profiled body 32 can be an extruded or a stamped sheet metal part. The profiled body 32 can be a composite material, for example, a fiber reinforced laminate or sheet. For example, the profiled body 32, base 14, cover 20, and crossbeams 16, can each, individually, include aluminum, steel, a continuous glass fiber composite laminate or tape, a continuous carbon fiber laminate or tape, a fiber filled thermoplastic resin, and/or a highly oriented polymeric material continuous.

Figures 7A, 7B, 7C:
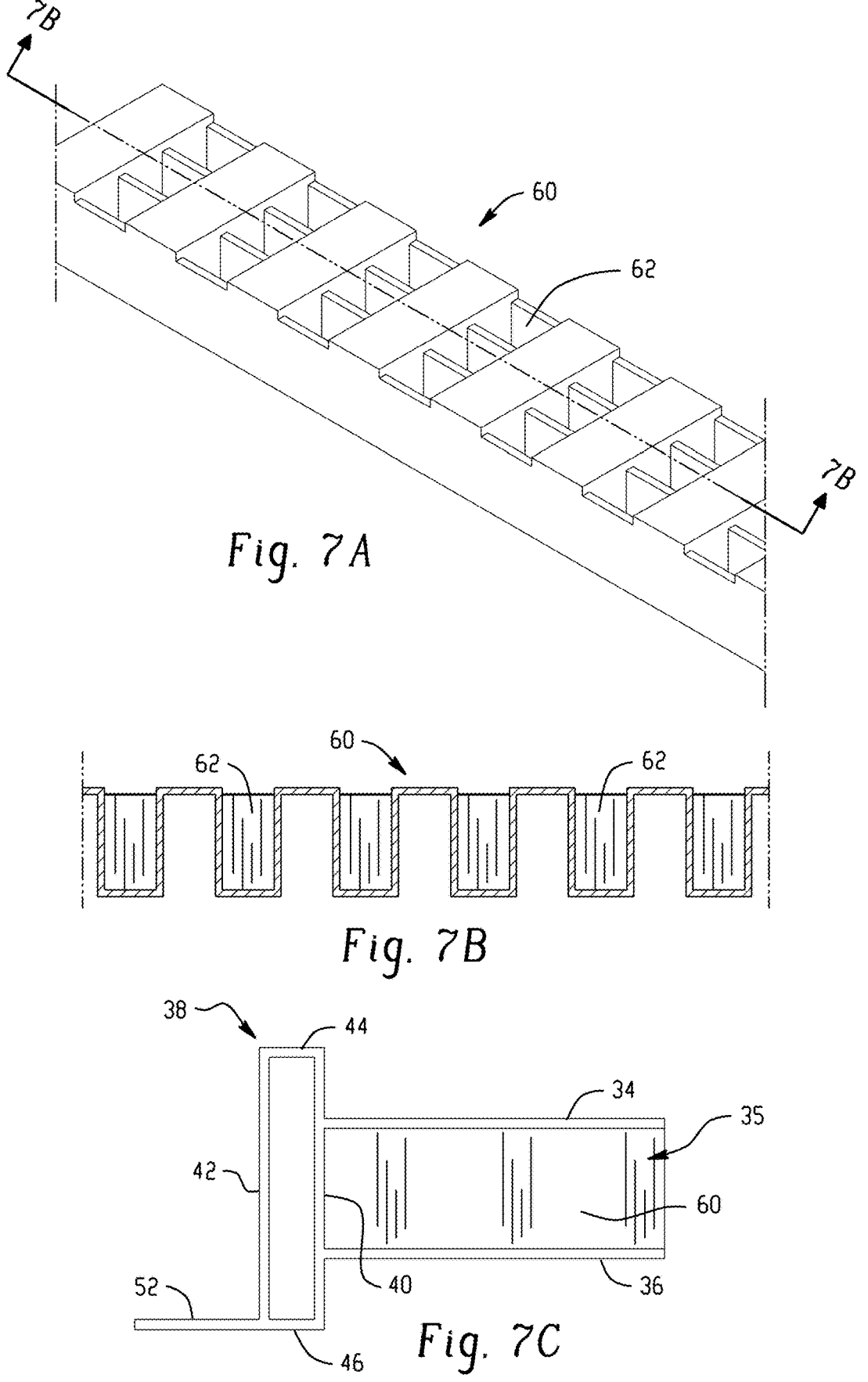
FIG. 7A is a partial perspective view of another embodiment of a polymer reinforcement.
FIG. 7B is a cross-sectional view of the polymer reinforcement of FIG. 7A taken along lines 7B-7B.
FIG. 7C is a side view of a side member comprising the polymer reinforcement of FIGS. 7A and 7B, and another embodiment of a frame.

FIGS. 6 and 7A-7C show an embodiment in which the polymer reinforcement 60 is molded separately, and inserted into the extruded profiled body 32. The draw direction or tool movement for the polymer reinforcement 60 can be in a vertical direction. FIG. 6 illustrates a polymer reinforcement 60 being inserted into the channel 35 of the profiled body 32. FIGS. 7A-7C illustrate a polymer reinforcement 60 having a square wave rib design (see FIG. 7B, which shows a cross-sectional view of the polymer reinforcement 60 along the line 7B-7B of FIG. 7A). As shown, the polymer reinforcement 60 can include additional ribs 62 in valleys of the square wave (see FIG. 7A; for example, illustrating ribs parallel to one another in each valley of the square wave). The ribs in the valleys extend from one side to the opposite side of the valley in a direction normal to the impact direction, e.g., in the length direction (see FIG. 1). FIG. 7C shows a side view of the profiled body 32 comprising the polymer reinforcement 60 of FIGS. 7A and 7B.

Figure 8A:
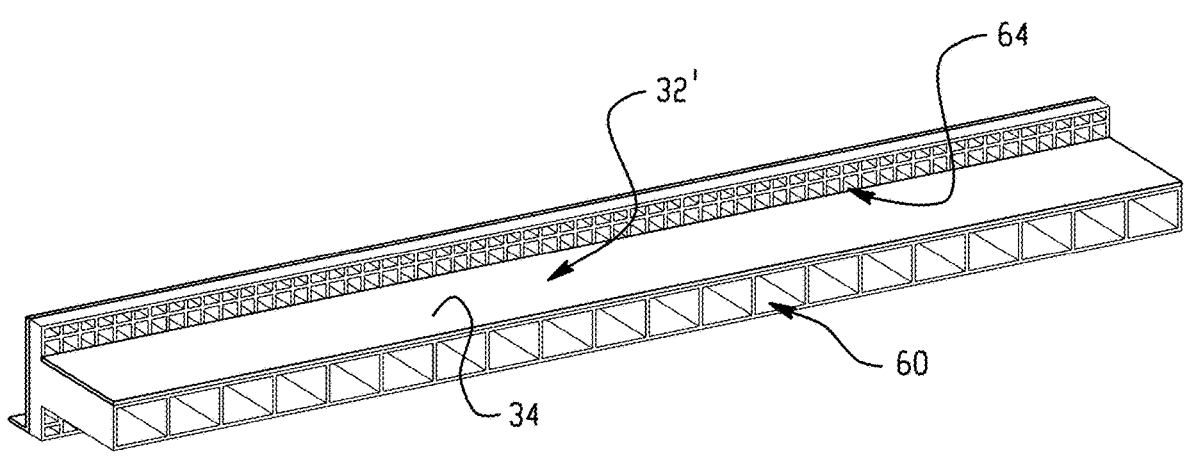
FIG. 8A is a perspective view of another embodiment of a side member comprising another embodiment of polymer reinforcement with structural reinforcement elements.
Figure 8B:
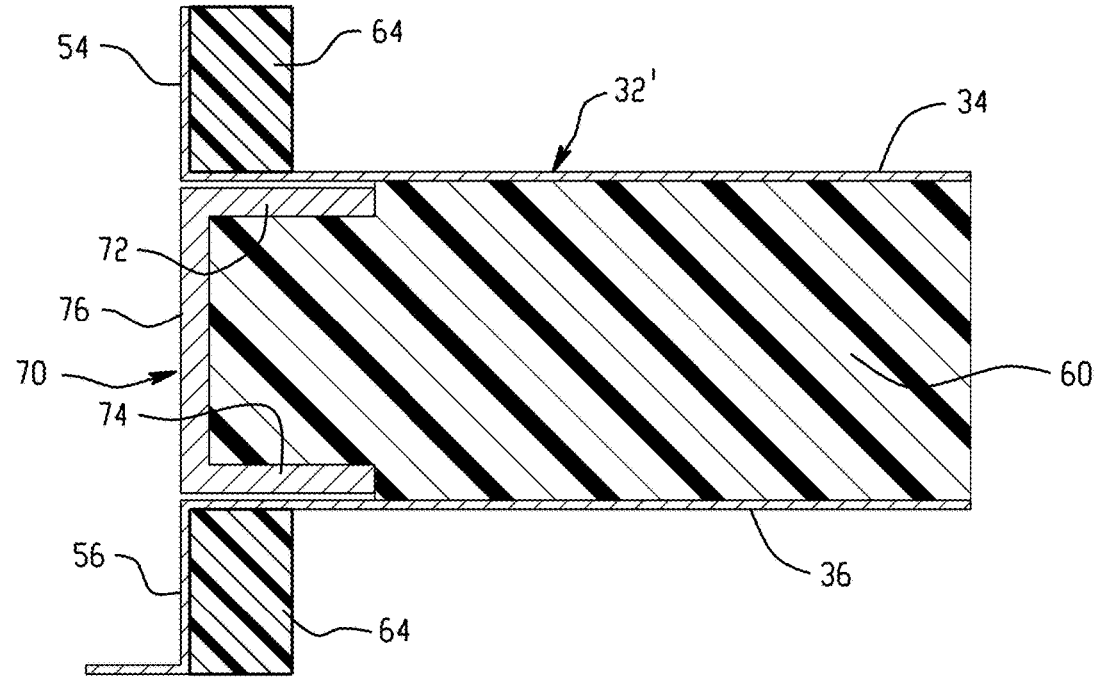
FIG. 8B is a cross-sectional side view of the embodiment of FIG. 8A.

FIGS. 8A and 8B illustrate another design of the profiled body 32' comprising a top wall 34 that extends to a first support wall 54, a bottom wall 36 that extends to a second support wall 56, and a reinforcement support element 70 that extends between the top wall 34 and the bottom wall 36, at the location of the first and second support walls 54, 56. The first support wall 54 can extend perpendicular from top wall 34, away from the channel 35. The second support wall 56 can extend perpendicular from bottom wall 36, away from the channel 35. The reinforcement support element 70 can optionally comprise a first support arm 72 and a second support arm 74 each extending from ends of the sidewall 76 of the reinforcement support element 70, forming a connecting section between the support arms. The reinforcement support element 70 can have a thickness that is greater than the total thickness of the first support wall 54, the second support wall 56, top wall 34, and the bottom wall 36. The thickness of the reinforcement support element 70 can vary, for example, from 0.5 mm to 2.00 mm, based on the stiffness requirement and material used. For example, if the reinforcement support element 70 includes steel, the thickness can be about 1.00 mm or less, and if the reinforcement support element 70 includes aluminum, the thickness can be about 2.00 mm. A second polymer reinforcement 64 can be attached (e.g., overmolded on) to the first support wall 54 and/or the second support wall 56. The second polymer reinforcement 64 may be adjacent to the first and/or second support wall 54, 56. In addition, the second polymer reinforcement 64 may be adjacent to the top and/or bottom wall 34, 36, respectively, i.e. the second polymer reinforcement 64 may be provided in a corner formed between the top wall 34 and the first support wall 54 and/or in a corner formed between the bottom wall 36 and the second support wall 56. The second polymer reinforcement 64 can provide additional crush resistance that may assist in improving energy absorption efficiency of the profiled body 32. The thickness of the second polymer reinforcement 64 can vary from 1.5 mm to 4.00 mm, and the second polymer reinforcement 64 can include thermoplastic material. The second polymer reinforcement 64 can have geometries as described for the polymer reinforcement 60 as described above, and is inserted into the channel 35. The geometries of the polymer reinforcement 60 and the second polymer reinforcement 64 can be similar or different. When a square wave geometry is used for the second polymer reinforcement 64, the distance between alternating sidewalls of the second polymer reinforcement 64 can vary from 25 mm to 50 mm, and the second polymer reinforcement 64 can include alternating top and bottom surfaces as illustrated in FIG. 7A. The alternating top and bottom surfaces can provide additional crush resistance that may assist in improving energy absorption efficiency.

Figure 9:
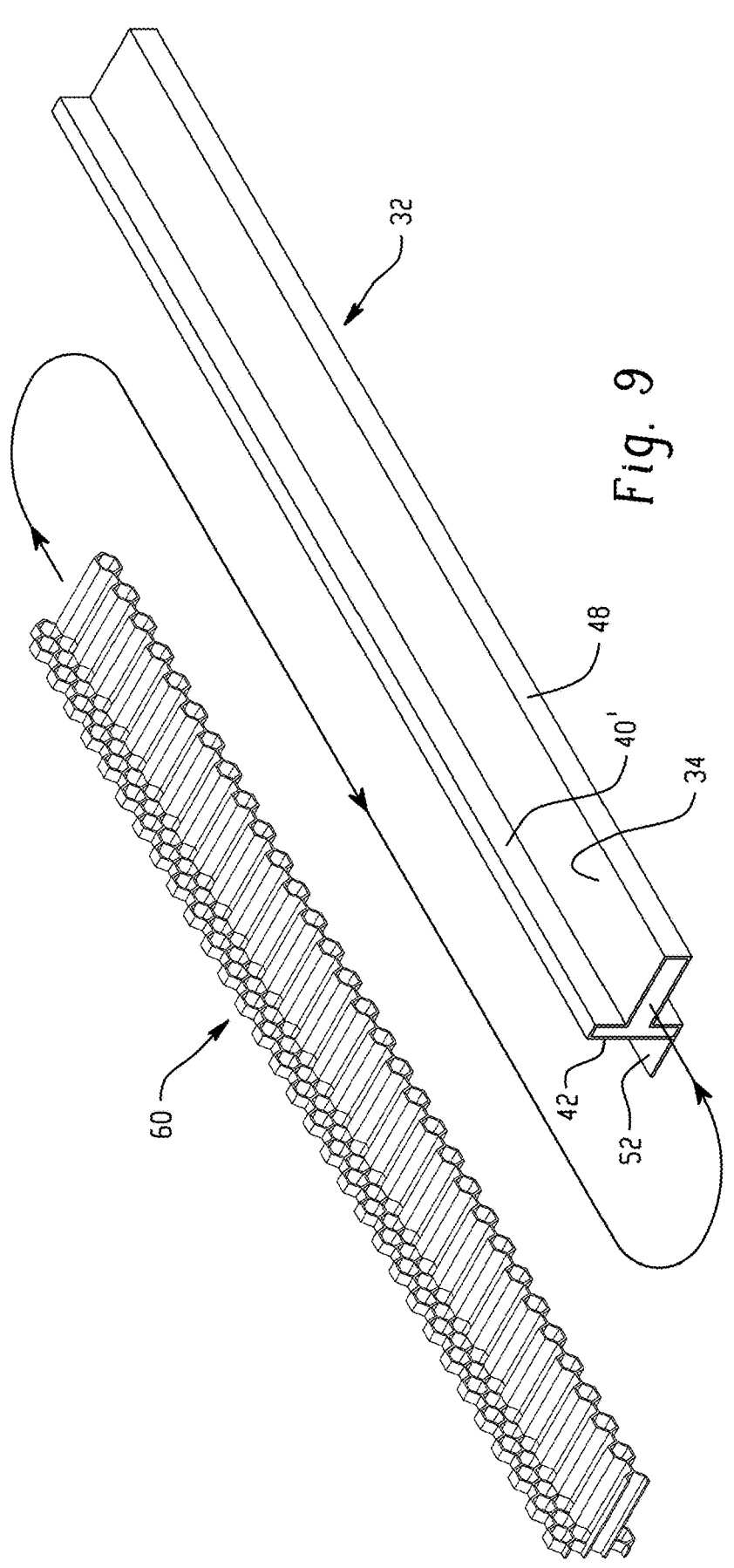
FIG. 9 is an expanded perspective view of another embodiment of a side member that illustrates assembly of a frame with a polymer reinforcement.

FIG. 9 shows an embodiment in which an injection molded polymer reinforcement 60 can be slid into an extruded profiled body 32. The polymer reinforcement 60 may include ribs, and/or an alveolar structure, e.g., honeycombs, that will extend in the channel 35, and further comprises shorter ribs that will extend between sidewall 42 and rear wall 40'. In this embodiment, the rear wall 40' extends from the ends of the channel 35, but does not extend across the channel 35. As with the other designs, flange 52 extends from the sidewall 42, away from the channel 35.

Figure 10:
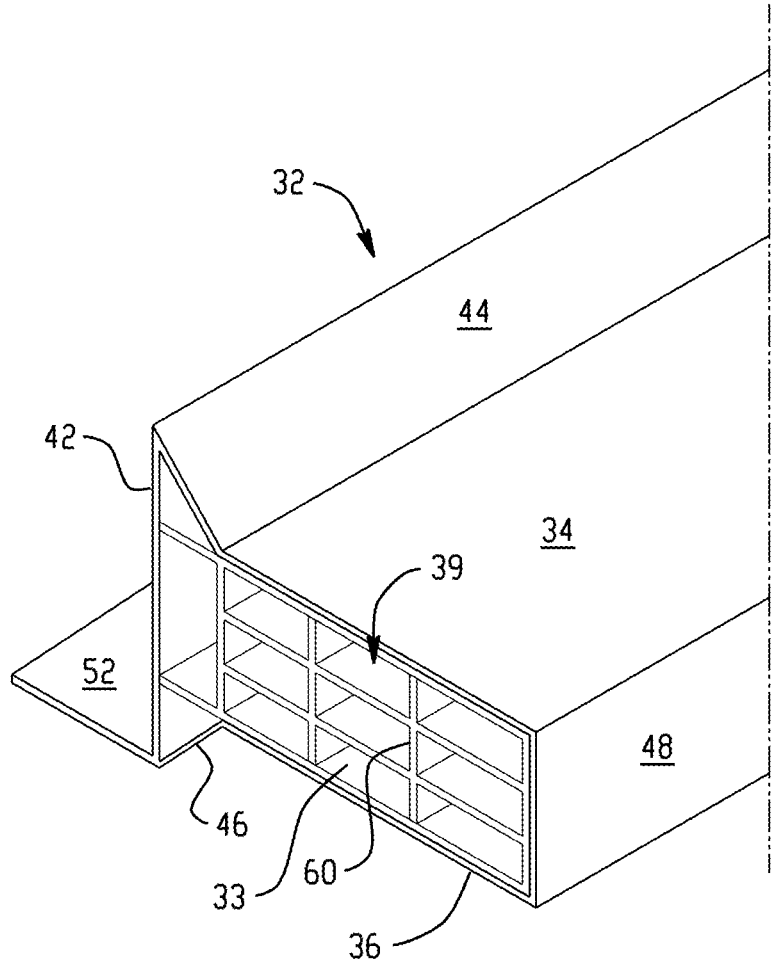
FIG. 10 is a partial perspective view of another embodiment of a side member.

FIG. 10 illustrates an embodiment in which a polymer reinforcement 60 has openings that extend over the length of the side member 30 (as opposed to perpendicular to the length of the side member 30). In this design, the polymer reinforcement 60 can be coextruded with a profiled body 32 made with metal or composite laminates or tapes. Alternatively, the polymer reinforcement 60 can be separately formed and inserted into the profiled body 32. The polymer reinforcement 60 may include ribs extending both parallel and perpendicular to the walls 34, 36 of the profiled body 32.

In the design of FIG. 10, there is no rear wall 40. The first connector wall 44 extends from the top wall 34 to the sidewall 42 and the second connector wall 46 extends from the bottom wall 36 to the sidewall 42, i.e. the connector walls 44, 46 extend from the sidewall 42 to the channel 35, thus forming a box structure (e.g., a four sided box structure) in the profiled body 32. The first connector wall 44 and/or second connector wall 46 can extend at an angle ⊖ of 90 degrees or less from the sidewall 42 to the top or bottom wall, respectively, e.g., at an angle of 30 to 75 degrees, preferably 40 to 50 degrees.

Examples

A rigid pole impact at 30 kilometers per hour (km/h) according to Federal Motor Vehicle Safety Standard 214 was performed on vehicle battery pack frame including the side members shown in FIG. 5 (Example 1), FIGS. 7A-C (Example 2), and FIGS. 8A-B (Example 3). A Comparative Example included extruded aluminum side members not including a polymer reinforcement 60. The Comparative Example included a rectangular channel with a 130 millimeters (mm) by 25 mm attachment portion and a 145 mm by 60 mm protruding rectangular section. The thickness varied from 1 mm to 8 mm, with the attachment portion having a thickness of 8 mm. The Comparative Example included a plurality of ribs therein in a single extruded metal. The Comparative Example included extruded aluminum walls. The overall design represented a T-structure with the leg of the T addressing the energy absorbing walls and top horizontal walls offering bending stiffness. The overall dimensions of Examples 1-3 corresponded to that of the Comparative Example, and the thickness of the attachment portion in Examples 1-3 was 5 mm. The weight of the extruded aluminum side members of the Comparative Example was approximately 15 kilograms (kg) each, and each of the side members in Examples 1-3 had a weight of approximately 12 kg, thus providing a weight reduction of approximately 20%. Therefore, for a 1.5-ton vehicle, it has been demonstrated that similar protection of the battery modules can be attained with a 20% reduction in weight.

Figure 11:
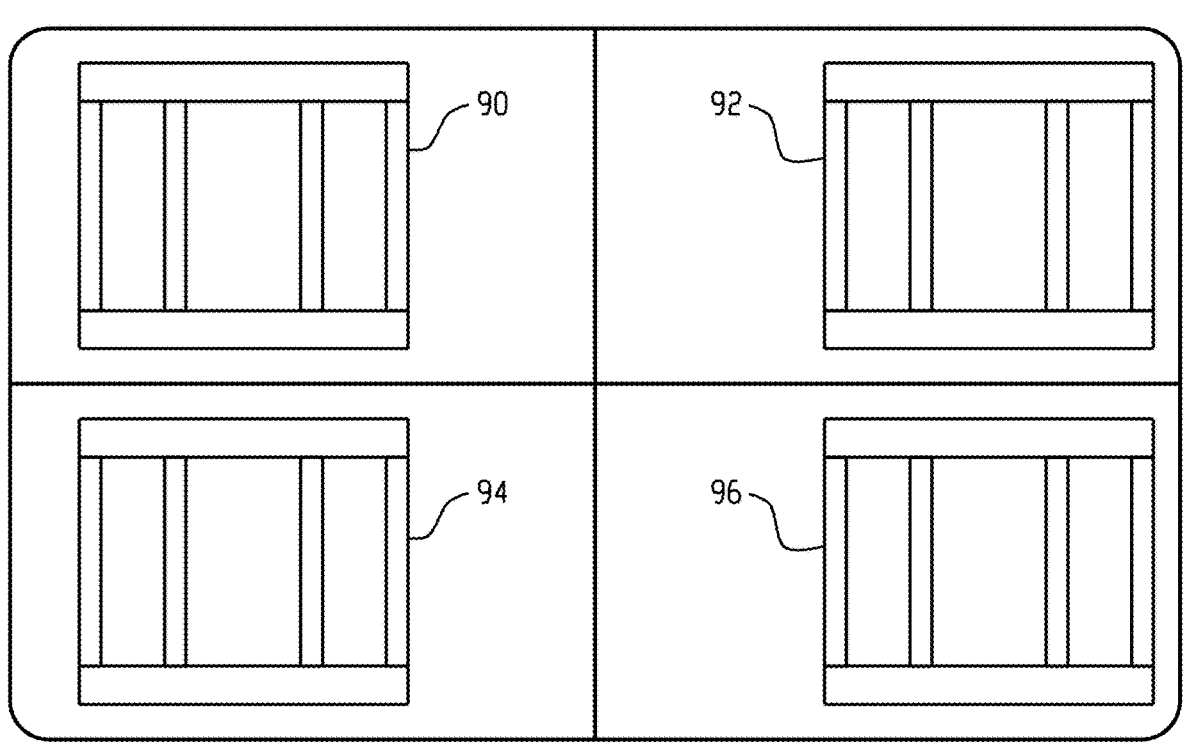
FIG. 11 is a top schematic view illustrating the four battery packs of the Comparative Example and of Examples 1-3, each having different side members before impact testing.
Figure 12:
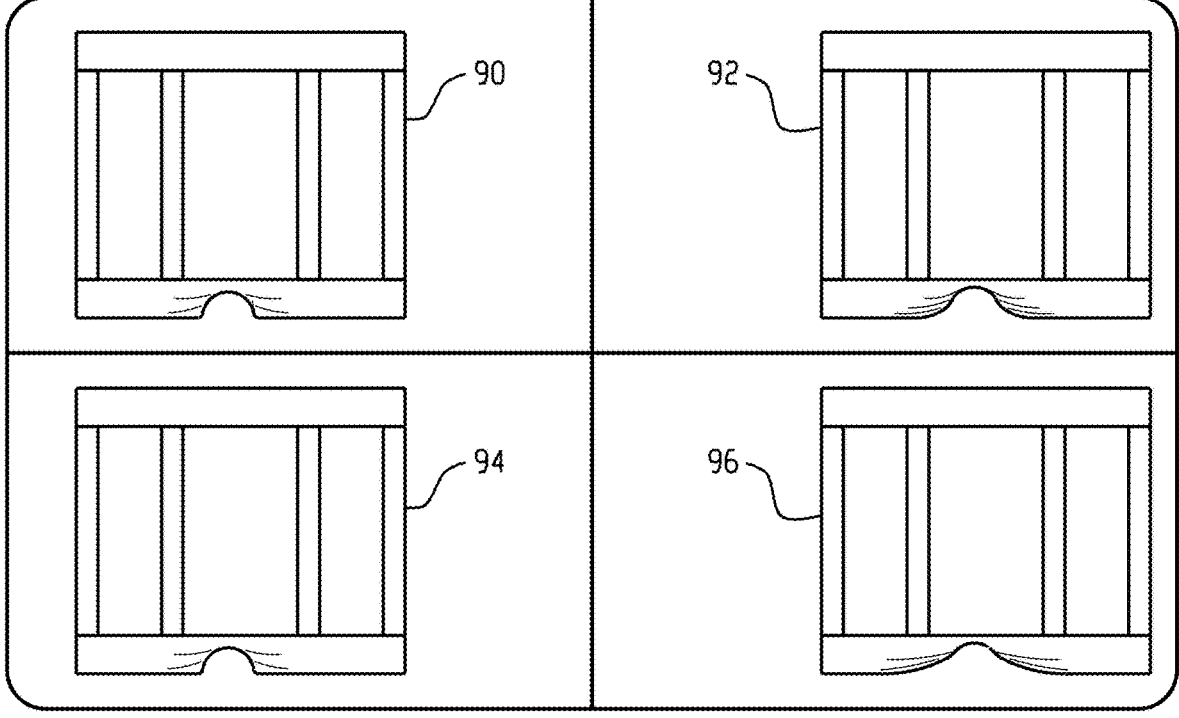
FIG. 12 is a top view illustrating the four battery packs of FIG. 11 after side impact testing at 30 kilometers per hour (km/h) against a pole.
Figure 13A:
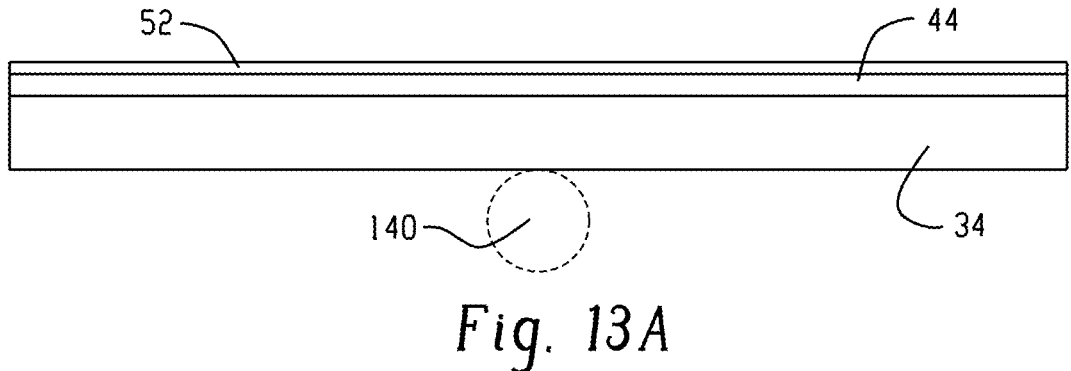
FIG. 13A-13C illustrate the progressive details of impact testing on the side member embodiment shown in FIGS. 8A and 8B.
Figure 13B:
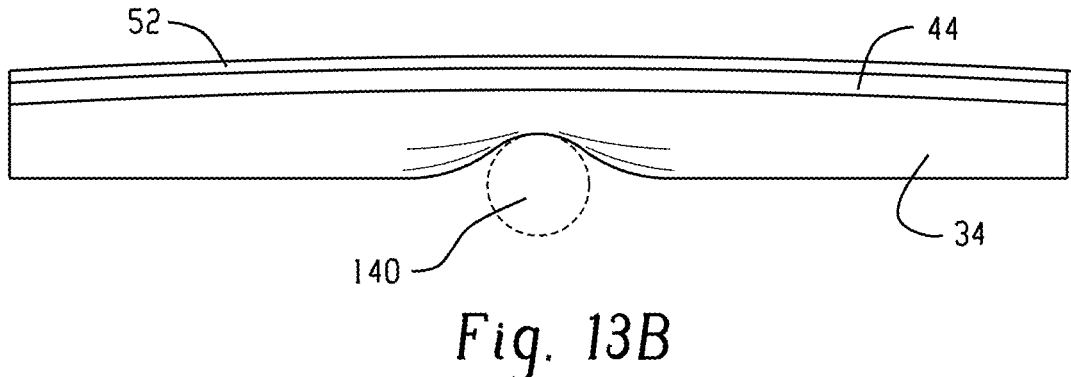
Figure 13C:
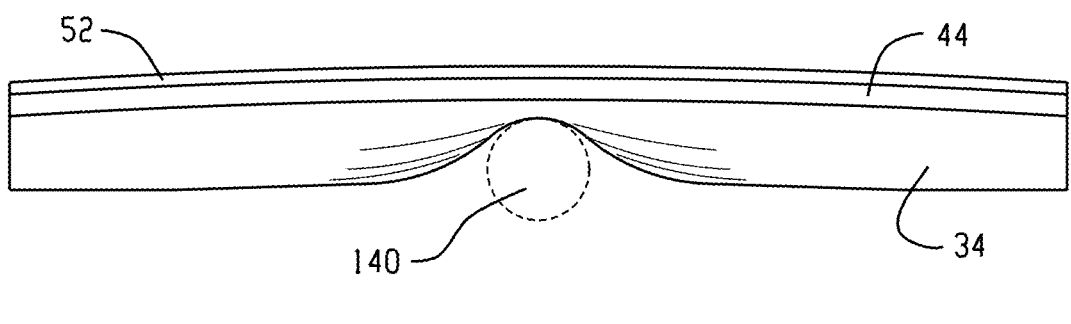

As can be seen in FIGS. 11-14, the side members in Examples 1-3 exhibited comparable intrusion as that of the Comparative Example. Intrusion is measured along the width of a vehicle normal to the impact direction. In particular. FIG. 11 shows the Comparative Example (#90) and Examples 1-3 (92, 94, 96, respectively) before impact testing and FIG. 12 shows maximum intrusion of the Comparative Example and Examples 1-3 after the 30 kilometers per hour (km/h) pole impact. FIGS. 13A-13C shows progressive details of impact testing on an embodiment shown in FIGS. 8A and 8B. In particular, FIG. 13A shows the polymer reinforcement 60 at the beginning of impact with the rigid pole 140, FIG. 13B shows the polymer reinforcement 60 during impact with the rigid pole 140, and FIG. 13C shows the polymer reinforcement 60 at the end of impact with the rigid pole 140.

Figure 14:
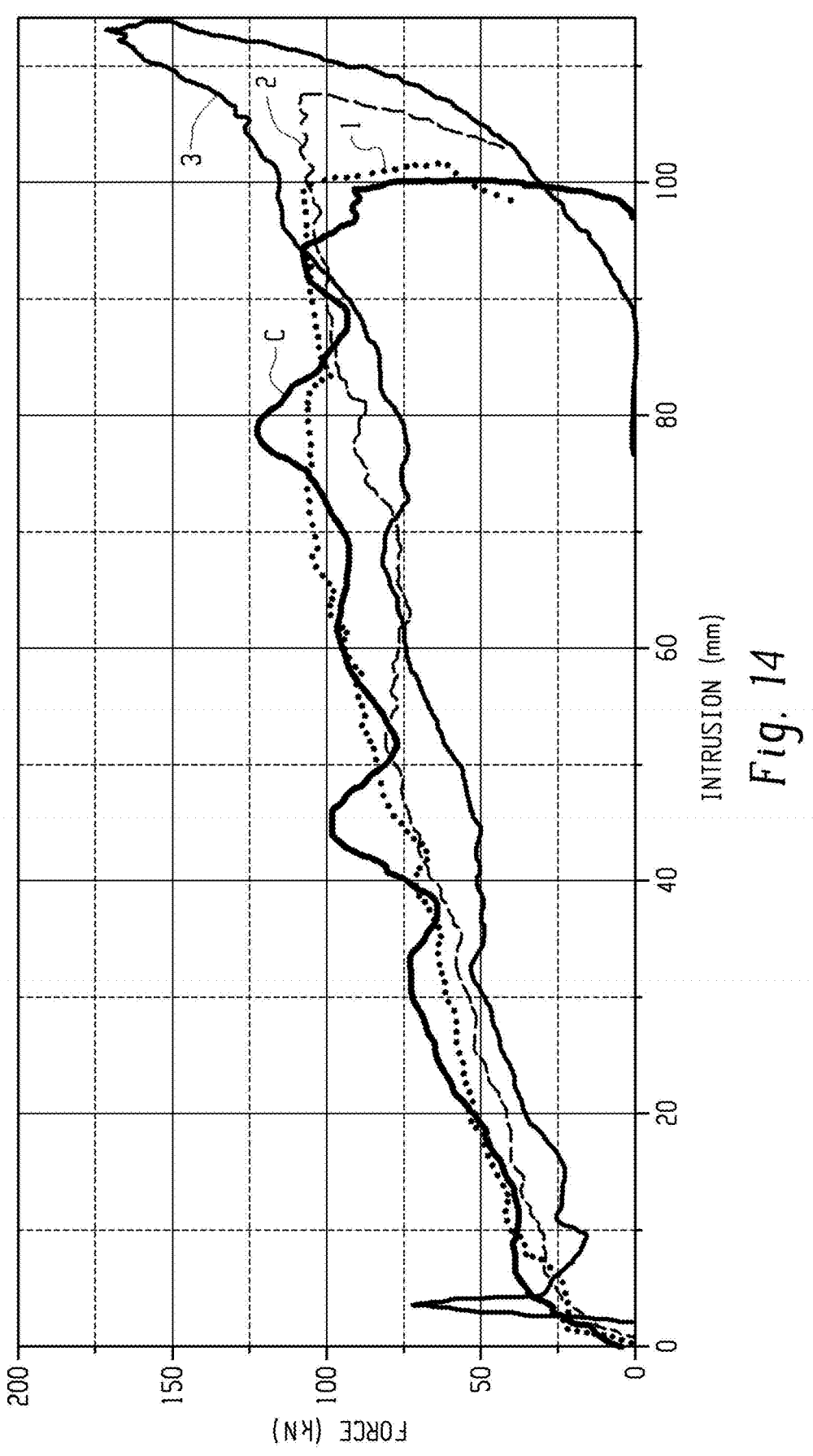
FIG. 14 is a graphical representation of force (kiloNewtons (kN)) versus intrusion (millimeters (mm)) for the Comparative Example and Examples 1-3 showing results of the impact testing.

FIG. 14 is a graph of force (kilonewtons (kN)) versus intrusion (millimeters (mm)) for the Comparative Example (line C) and Examples 1-3 (lines 1, 2, and 3 respectively) showing results of the impact testing. As can be seen from these tests, Examples 1 had the most comparable results to the Comparative Example, with substantially the same area under the curve. Example 3 did not crush fully as can be seen by the lower area under the curve, particularly under 100 mm intrusion, and the intrusion and high force at greater than 100 mm. Example 3 has a design of the polymer reinforcement 60 wherein there is a top wall, a bottom wall, and ribs extending therebetween so as to form (four sided) openings with the ribs and the openings extending in the direction of impact (e.g., away from the sidewall 76 of the reinforcement support element 70).

Further tests were performed on side members having a polymer reinforcement 60 made of XENOY™ (a PC/PBT blend sold by SABIC) (Example 4) or STAMAX™ (a long glass fiber filled polypropylene sold by SABIC) with 30 wt. % long glass fibers (Example 5) at various low temperatures, i.e. below zero degrees Celsius. Graphs of force (kiloNewtons (kN)) versus intrusion (millimeters (mm)) for Example 4 (FIG. 15A) and Example 5 (FIG. 16A) show results of the low temperature impact testing.

Figures 15A, 15B:
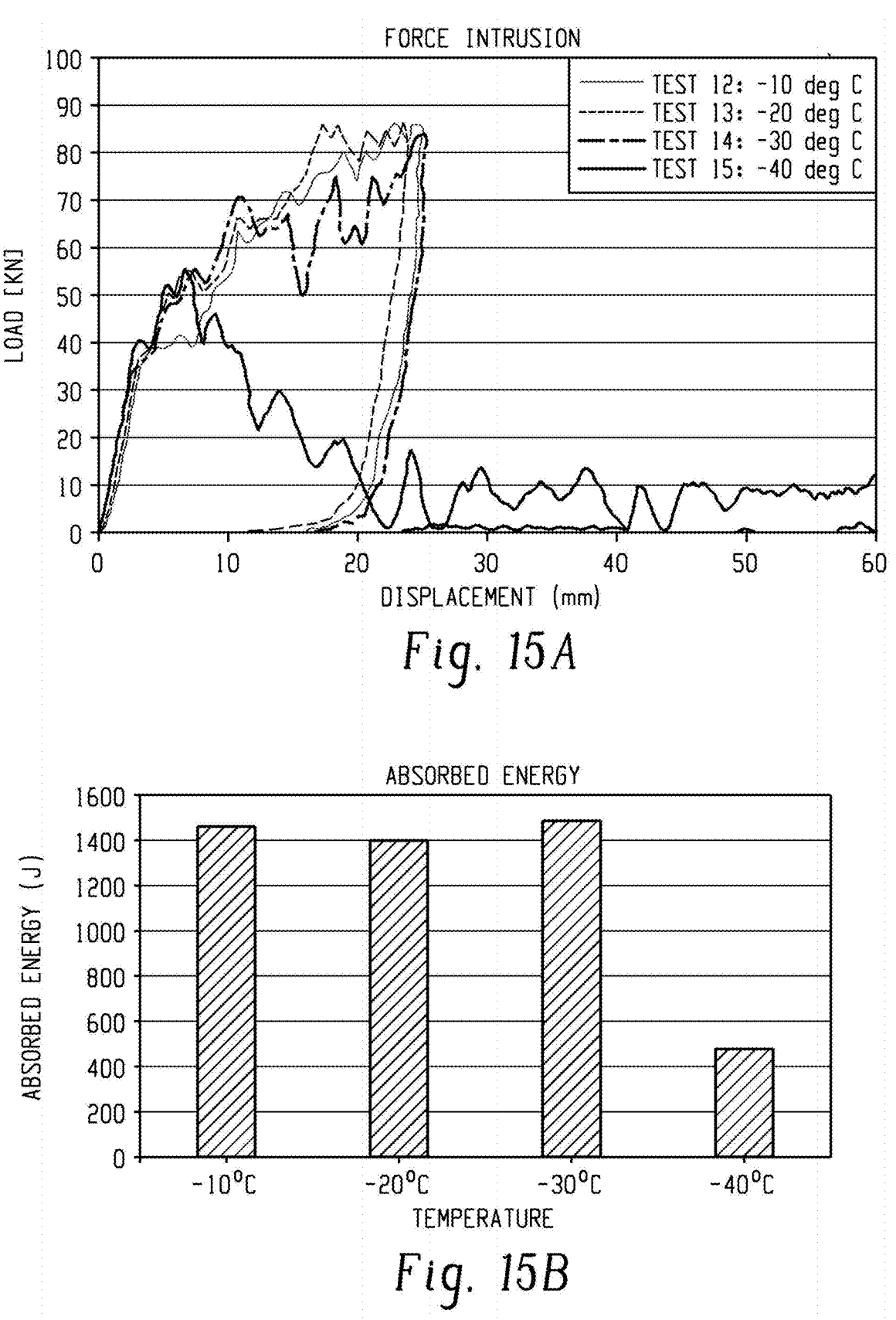
FIG. 15A is a graphical representations of force (kiloNewtons (kN)) versus intrusion (millimeters (mm)) for Example 4 showing results of the impact testing at low temperatures.
FIG. 15B is a graphical representations of absorbed energy in Joules (J) versus temperature (° C.) for Example 4.

FIG. 15A shows that for the XENOY™ reinforcement, the area under the curves is almost similar for temperatures of minus 10 degrees Celsius (test 12), minus 20 degrees Celsius (test 13) and minus 30 degrees Celsius (test 14). Similar behavior is seen in the columns in FIG. 15B, where the columns resembling the amount of absorbed energy is almost equal, or at least does not change significantly, at minus 10 degrees Celsius, minus 20 degrees Celsius and minus 30 degrees Celsius. The curve and the column of the test at minus 40 degrees Celsius (test 15) in FIG. 15B show that the XENOY™ reinforcement could not absorb a similar amount of energy as with the higher temperatures. This is due to embrittlement of the XENOY™ material below minus 30 degrees Celsius, causing total failure of the XENOY™ reinforcement at minus 40 degrees Celsius.

Figure 16A:
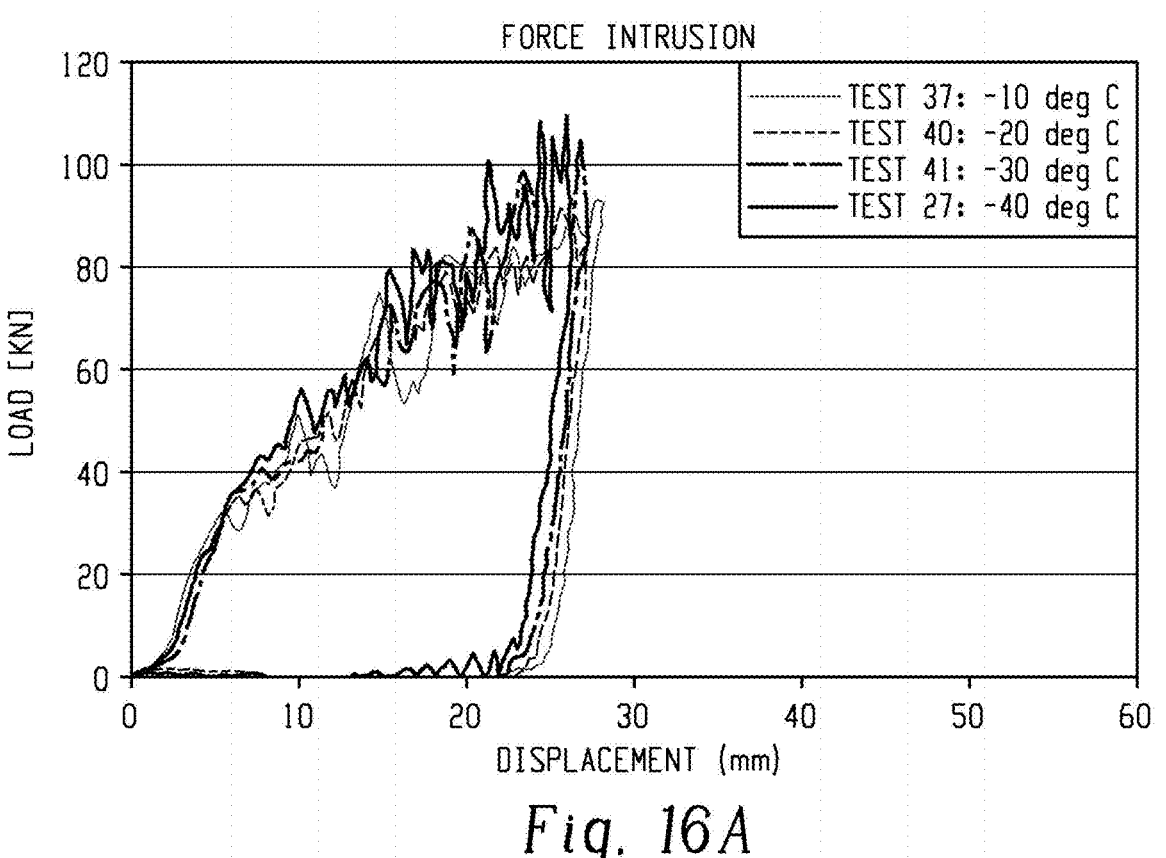
FIG. 16A is a graphical representations of force (kN) versus intrusion (mm) for Example 5 showing results of the impact testing at low temperatures.
Figure 16B:
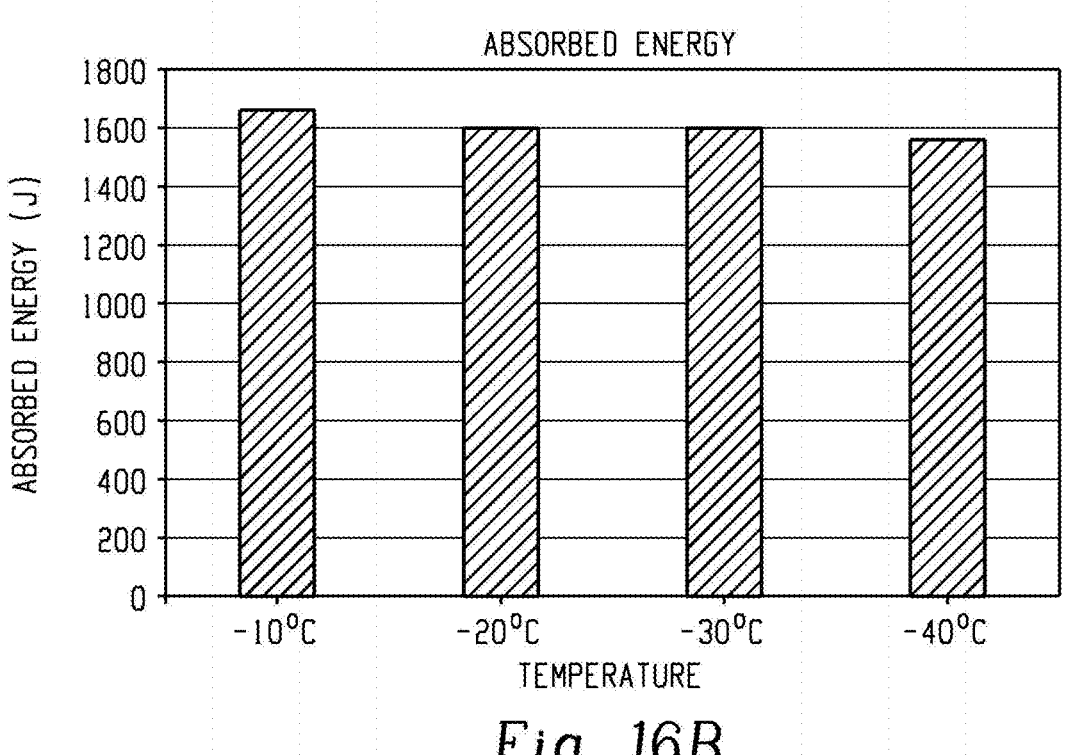
FIG. 16B is a graphical representations of absorbed energy (J) versus temperature (° C.) for Example 5.

FIG. 16A shows that for the STAMAX™ reinforcement, the area under the curves is almost similar for temperatures of minus 10 degrees Celsius, minus 20 degrees Celsius, minus 30 degrees Celsius and minus 40 degrees. Similar behavior is seen in the columns in FIG. 16B, where the columns resembling the amount of absorbed energy is almost equal, or at least does not change significantly, at minus 10 degrees Celsius (test 37), minus 20 degrees Celsius (test 40), minus 30 degrees Celsius (test 41) and minus 40 degrees Celsius (test 27). As such, the STAMAX™ reinforcement 60 has a steady performance at each tested low temperature and does not become brittle at minus 40 degrees Celsius. In addition, when comparing the maximum load versus intrusion and the total amount of energy absorbed for both XENOY™ and STAMAX™, the STAMAX™ reinforcement shows an ability of taking up a higher load and absorbing more energy at the same temperatures.

This disclosure further encompasses the following aspects.

Aspect 1. A vehicle battery pack frame for a vehicle comprising a base having a length and a width; side members on opposite sides of the base, extending along the length of the base, and attached to a periphery of the base; and crossbeams extending across the width of the base, between the side members; wherein each of the side members comprises a profiled body comprising a sidewall having a first surface facing the cross beams, and an opposite second surface; and a polymer reinforcement attached to the profiled body and facing the second surface of the sidewall of the profiled body.

Aspect 2: A vehicle battery pack frame for a vehicle comprising: a base having a length and a width; side members on opposite sides of the base, extending along the length of the base, and attached to a periphery of the base; crossbeams extending across the width of the base, between the side members; and a cover extending between the side members, wherein the crossbeams are disposed between the cover and the base, and preferably wherein the cover is configured to enclose a plurality of battery modules in the vehicle battery pack frame; wherein the side members comprise: a profiled body having an attachment surface for attaching the crossbeams; and a polymer reinforcement located opposite the attachment surface of the profiled body.

Aspect 3: A vehicle battery pack frame for a vehicle comprising: a base having a length in a length direction and a width in the width direction; side members on opposite sides of the base, extending along the length of the base, and attached to a periphery of the base; cross beams extending across the width of the base, between the side members; and a cover extending between the side members, wherein the cross beams are disposed between the cover and the base, and preferably wherein the cover is configured to enclose a plurality of battery modules in the vehicle battery pack frame; wherein each of the side members comprises a frame to which the cross beams are attached; and a polymer reinforcement located opposite a surface of the frame to which the cross beams are attached.

Aspect 4. A vehicle battery pack frame for a vehicle comprising: a base having a length and a width; side members on opposite sides of the base, extending along the length of the base, and attached to a periphery of the base; crossbeams extending across the width of the base, between the side members; and a cover extending between the side members, wherein the crossbeams are disposed between the cover and the base, and preferably wherein the cover is configured to enclose a plurality of battery modules in the vehicle battery pack frame; wherein each of the side members comprise: a profiled body having a flange extending from a first side, and a channel on a second side, wherein the base extends between the side members and over the flange; and a polymer reinforcement located in the channel.

Aspect 5. A vehicle battery pack frame according to any preceding Aspect, further comprising a cover extending between the side members, wherein the crossbeams are disposed between the cover and the base, and preferably, wherein the base, the side member and the cover enclose a plurality of battery modules in the vehicle battery pack frame.

Aspect 6: The vehicle battery pack frame according to any preceding Aspect, wherein the polymer reinforcement is adjacent to the second surface of the sidewall.

Aspect 7: The vehicle battery pack frame according to any preceding Aspect, wherein the polymer reinforcement contacts the surface of the profiled body to which the crossbeams are attached.

Aspect 8. The vehicle battery pack frame according to any preceding Aspect, wherein the profiled body comprises metal, preferably aluminum or steel, more preferably aluminum.

Aspect 9. The vehicle battery pack frame according to any preceding Aspect, wherein each of the side members comprises a polymer reinforcement overmolded to the profiled body.

Aspect 10. The vehicle battery pack frame according to any preceding Aspect, wherein the polymer reinforcement comprises ribs extending in a direction away from the crossbeams.

Aspect 11. The vehicle battery pack frame according to any preceding Aspect, wherein a stiffness of the polymer reinforcement is less than a stiffness of the profiled body.

Aspect 12. The vehicle battery pack frame according to any preceding Aspect, wherein the polymer reinforcement comprises a foam, an alveolar structure, e.g. honeycombs, ribs, or a combination comprising at least one of the foregoing.

Aspect 13. The vehicle battery pack frame according to any preceding Aspect, wherein the columns of the alveolar structure have a varying diameter of 20 to 40 millimeters and a wall thickness of 1.5 to 5.0 millimeters.

Aspect 14. The vehicle battery pack frame according to any preceding Aspect, wherein the side members are configured such that each polymer reinforcement absorbs impact energy during a rigid pole impact at 30 kilometers per hour according to Federal Motor Vehicle Safety Standard 214 such that each profiled body and the vehicle battery pack frame retain structural integrity following the rigid pole impact.

Aspect 15: The vehicle battery pack frame according to any preceding Aspect, wherein the profiled body comprises a channel extending away from the cross beams; and wherein the polymer reinforcement is disposed in the channel.

Aspect 16. The vehicle battery pack frame according to any preceding Aspect, wherein: the profiled body comprises a channel opposite the surface of the profiled body to which the crossbeams are attached; and the polymer reinforcement is in the channel.

Aspect 17. The vehicle battery pack frame according to any preceding Aspect, wherein the profiled body comprises a box structure adjacent to the channel, wherein the box structure comprises a sidewall spaced apart from the channel, and wherein the box structure is formed by a first connector wall extending between the sidewall to the top wall of the channel, and a second connector wall extending between the sidewall to the bottom wall of the channel.

Aspect 18. The vehicle battery pack frame according to Aspect 17, wherein the box structure is formed by the sidewall, the connector walls and the rear wall of the channel, or wherein the box structure opens up into the channel.

Aspect 19. The vehicle battery pack frame according to Aspect 17 or 18, wherein the sidewall has a height that is greater than a height of the channel, and/or greater than the height of the rear wall, such that the height of the box structure is larger than that of the channel.

Aspect 20. The vehicle battery pack frame according to any of Aspects 17-19, wherein the first connector wall and second connector wall extend at an angle $\ominus$ of 90 degrees or less from the sidewall towards the channel, preferably at an angle of 30 to 75 degrees, preferably 40 to 50 degrees.

Aspect 21. The vehicle battery pack frame according to any of Aspects 1-16, wherein the profiled body comprises a top wall, a bottom wall forming a channel in between and a reinforcement support element that extends between the top wall and the bottom wall, wherein a first support wall extends from the top wall, away from the channel, and a second support wall extends from the bottom wall, away from the channel, wherein the reinforcement support element is provided at the location of the first and second support walls.

Aspect 22. The vehicle battery pack frame according to Aspect 21, wherein a second polymer reinforcement is attached to the first and/or second support wall, preferably adjacent to the first and/or second support wall and/or to the top and/or bottom wall, respectively.

Aspect 23. The vehicle battery pack frame according to any of the preceding Aspect, wherein the polymer reinforcement comprises an alveolar structure having columns oriented perpendicular to a longitudinal axis of the channel.

Aspect 24. The vehicle battery pack frame according to any preceding Aspect, wherein the reinforcement structure comprises honeycombs oriented perpendicular to a major axis of the channel, and wherein the major axis of the channel is the length direction.

Aspect 25. The vehicle battery pack frame according to any preceding Aspect, wherein the side members have a length of greater than 1 to 3 meters, preferably between 1.5 to 2.0 meters.

Aspect 26. The vehicle battery pack frame according to any preceding Aspect, wherein: each profiled body further comprises a flange; wherein the flange of one side member extends from the sidewall towards the flange of the other side member; and the base extends between the side members and is disposed on the flange of each side member.

Aspect 27. A vehicle battery pack assembly comprising: the vehicle battery pack frame according to any of Aspects 1-26; and a plurality of battery modules in the vehicle battery pack frame.

Aspect 28. A vehicle comprising the vehicle battery pack assembly according to Aspect 27.

Aspect 29. A method of forming the vehicle battery pack frame according to any of Aspects 1-26, the method comprising: combining the polymer reinforcement and the profiled body to form the side members; and attaching the crossbeams and the profiled body to one another.

Aspect 30. The method according to Aspect 29, comprising injection molding the polymer reinforcement 60 in a channel opposite the surface of the profiled body to which the crossbeams are attached.

Aspect 31. The method according to any of Aspects 29-30, comprising coextruding the polymer reinforcement 60 and the profiled body.

Aspect 32. The method according to any of Aspects 29-31, comprising: molding the polymer reinforcement 60; forming the profiled body by extrusion or stamping sheet metal; and inserting the polymer reinforcement 60 in the profiled body.

The term "battery module" as used herein may refer to any of a variety of different battery types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers/to multiple individual battery modules contained within a single piece or multi-piece housing, the individual battery modules electrically interconnected to achieve the desired voltage and capacity for a particular application.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an embodiment" means that a particular element described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A vehicle battery pack frame for a vehicle comprising:
a base having a length and a width;
side members on opposite sides of the base, extending along the length of the base, and attached to a periphery of the base; and
multiple crossbeams extending across the width of the base, between the side members from a first side member to a second side member on the opposite side of the base;
wherein each of the side members comprises
  a profiled body comprising
    a bottom wall,
    a top wall spaced apart from the bottom wall in a height direction,
    a sidewall having a first surface facing the crossbeams, and an opposite second surface, and
    a flange, wherein
      the bottom wall is spaced apart from the flange in the height direction,
      the flange of one side member extends from the sidewall towards the flange of the other side member, and
      the base extends between the side members and is disposed on the flange of each side member; and
  a polymer reinforcement attached to the profiled body and facing the second surface of the sidewall of the profiled body,
  wherein the profiled body comprises the top wall, the bottom wall forming a channel in between and a reinforcement support element that extends between the top wall and the bottom wall, wherein a first support wall extends from the top wall, away from the channel, and a second support wall extends from the bottom wall, away from the channel, wherein the reinforcement support element is provided at the location of the first and second support walls, and
wherein a second polymer reinforcement is attached to the first support wall and the second support wall.

2. The vehicle battery pack frame according to claim 1, further comprising a cover extending between the side members, wherein the crossbeams are disposed between the cover and the base.

3. The vehicle battery pack frame according to claim 1, wherein the polymer reinforcement is adjacent to the second surface of the sidewall.

4. The vehicle battery pack frame according to claim 1, wherein the polymer reinforcement is disposed in the channel.

5. The vehicle battery pack frame according to claim 4, wherein the flange of one side member extends from the sidewall away from the channel.

6. The vehicle battery pack frame according to claim 1, wherein the profiled body comprises a box structure adjacent to the channel, wherein the box structure is formed by the sidewall spaced apart from the channel, and a first connector wall extending between the sidewall to the top wall of the channel, and a second connector wall extending between the sidewall to the bottom wall of the channel.

7. The vehicle battery pack frame according to claim 6, wherein the box structure is formed by the sidewall, the connector walls and a rear wall of the channel, wherein the rear wall extends between the top wall and the bottom wall; or wherein the box structure opens up into the channel.

8. The vehicle battery pack frame according to claim 6, wherein the sidewall has a height that is greater than a height of the channel or greater than the height of the rear wall, such that the height of the box structure is larger than that of the channel.

9. The vehicle battery pack frame according to claim 6, wherein the first connector wall and second connector wall extend at an angle $\ominus$ of 90 degrees or less from the sidewall towards the channel.

10. The vehicle battery pack frame according to claim 1, wherein the polymer reinforcement comprises an alveolar structure having columns oriented perpendicular to a longitudinal axis of the channel.

11. A vehicle battery pack assembly comprising:
the vehicle battery pack frame according to claim 1; and
a plurality of battery modules in the vehicle battery pack frame.

12. A vehicle comprising the vehicle battery pack assembly according to claim 11.

13. A method of forming the vehicle battery pack frame according to claim 1, the method comprising:
combining the polymer reinforcement and the profiled body to form the side members; and
attaching the crossbeams and the profiled body to one another.

* * * * *